United States Patent
Von Rundstedt et al.

(10) Patent No.: US 12,477,998 B2
(45) Date of Patent: Nov. 25, 2025

(54) DEVICE AND METHOD FOR PROPAGATING PLANTS

(71) Applicant: RoBoTEC PTC GmbH, Bremen (DE)

(72) Inventors: Stephan Von Rundstedt, Bremen (DE); Friederike Von Rundstedt, Bremen (DE)

(73) Assignee: ROBOTEC PTC GmbH, Bremen (DE)

( * ) Notice: Subject to any disclaimer, the term of this patent is extended or adjusted under 35 U.S.C. 154(b) by 150 days.

(21) Appl. No.: 17/626,329

(22) PCT Filed: Jul. 9, 2020

(86) PCT No.: PCT/EP2020/069422
§ 371 (c)(1),
(2) Date: Jan. 11, 2022

(87) PCT Pub. No.: WO2021/009010
PCT Pub. Date: Jan. 21, 2021

(65) Prior Publication Data
US 2022/0240455 A1     Aug. 4, 2022

(30) Foreign Application Priority Data

Jul. 12, 2019   (DE) .................. 102019004848.2

(51) Int. Cl.
*A01G 2/10*     (2018.01)
*A01G 2/00*     (2018.01)
(Continued)

(52) U.S. Cl.
CPC .............. *A01G 2/10* (2018.02); *G06T 7/0012* (2013.01); *G06T 7/97* (2017.01); *G06T 2207/10152* (2013.01); *G06T 2207/20084* (2013.01)

(58) Field of Classification Search
CPC ... A01G 2/10; A01G 2/00; A01G 3/00; G06T 2207/20084; G06V 10/81
See application file for complete search history.

(56) References Cited

U.S. PATENT DOCUMENTS 5,203,259 A * 4/1993 Miedema ............... A23N 15/02
99/585
5,382,268 A    1/1995 Brown
(Continued)

FOREIGN PATENT DOCUMENTS

| EP | 2454933 A1 | 5/2012 |
| WO | 2009100917 A1 | 8/2009 |
| WO | 2018024369 A1 | 2/2018 |

OTHER PUBLICATIONS

WIPO, International Search Report (in the parent application), Oct. 19, 2020.
(Continued)

*Primary Examiner* — Joshua D Huson
*Assistant Examiner* — Spencer T Callaway
(74) *Attorney, Agent, or Firm* — Laurence P. Colton; Smith Tempel Blaha LLC (57) ABSTRACT

A method and a device for propagating plants, by which the propagation rate or growth rate of the plants can be increased. This is achieved in that at least one plant is recorded at least in regions by an image recognition device and plant-specific features of the at least one plant are recognized by a control unit on the basis of the items of information obtained by the image recognition device. In dependence on the recognized features, at least one component of the plant is then automatically severed from the plant by a cutting means for propagation. A type and/or physical properties of the cutting means to increase a propagation rate
(Continued)

of the plants are selected in accordance with the recognized plant-specific features of the plant.

9 Claims, 5 Drawing Sheets

(51) Int. Cl.
*A01G 3/00* (2006.01)
*A01H 4/00* (2006.01)
*G06T 7/00* (2017.01)

(56) References Cited

U.S. PATENT DOCUMENTS

| | | |
|---|---|---|
| 5,656,186 A | 8/1997 | Mourou |
| 10,438,160 B1* | 10/2019 | New ................ G06Q 10/08 |
| 10,918,033 B2* | 2/2021 | von Rundstedt ........ A01H 4/00 |
| 2005/0150160 A1* | 7/2005 | Norgaard ................ A01G 2/00 |
| | | 47/58.1 SE |
| 2011/0047951 A1* | 3/2011 | Moore .................... A01D 46/24 |
| | | 56/328.1 |
| 2015/0027040 A1 | 1/2015 | Redden |
| 2019/0064363 A1* | 2/2019 | Redden ................ G06V 10/751 |
| 2019/0075732 A1 | 3/2019 | Gowa |
| 2019/0085279 A1* | 3/2019 | Leo ............................ A23L 2/56 |
| 2019/0380278 A1* | 12/2019 | Burden .................... B25J 9/003 |

OTHER PUBLICATIONS

Deutsches Patent—Und Markenamt (German Patent and Tradermrk Office), Recherchebericht (search in a related application), Jul. 3, 2020.

* cited by examiner

Fig. 8c

DEVICE AND METHOD FOR PROPAGATING PLANTS

CROSS REFERENCE TO RELATED APPLICATIONS

This application is the US National Phase of and claims the benefit of and priority on International Application No. PCT/EP2020/069422 having an international filing date of 9 Jul. 2020, which claims priority on and the benefit of German Patent Application No. 10 2019 004 848.2 having a filing date of 12 Jul. 2019.

BACKGROUND OF THE INVENTION

Technical Field

The invention relates to a method for propagating plants, in which at least one plant is recorded at least in regions by an image recognition device and plant-specific features are recognized by a control unit on the basis of the items of information obtained by the image recognition device about the at least one plant and, in dependence on the recognized features, at least one component of the plant is severed automatically by a cutting means from the plant for propagation, and wherein a type and/or physical properties of the cutting means are selected in accordance with the recognized plant-specific features of the plant to increase a propagation rate of the plant. Furthermore, the invention relates to a device for propagating plants having at least one image recognition device for recording at least one plant at least in regions, a control unit for recognizing plant-specific features on the basis of the items of information obtained by the image recognition device about the at least one plant, at least one transport means for transporting a plant or a component of a plant and at least one cutting means for cutting the plant or the component of a plant, wherein the physical properties of the cutting means are variable in dependence on the recognized plant-specific features to increase the propagation rate or a growth rate of the plants.

Prior Art

It is known that decorative and useful plants are propagated or reproduced nearly fully automatically. Due to the continuously growing demand in recent years for decorative and useful plants, the entire process of propagation has become industrialized. This industrialization of the plant propagation comprises automated severing of a plant component from a mother plant and automated supply of the severed plant component to a nutrient medium. In this vegetative propagation method or cloning of plants, the use of costly personnel can be dispensed with nearly completely.

The recognition of a suitable cutting position on the mother plant and the severing or cutting on the plant have proven to be particularly difficult and thus critical in the automation of the plant propagation. The success of the propagation or the propagation or growth rate of the separated plant component or of a clone is thus decisively dependent on the position on the mother plant at which a cut takes place. Plants have regions which particularly preferably continue to grow or particularly preferably develop roots, or do not, after a cut. In addition to the regions or parts of a plant which are suitable to different degrees for division or cloning, these regions vary from plant to plant. It can thus be that a region on an orchid which is particularly well suitable for a severing cut is less suitable for a corresponding cut on a hemp plant. An optimal cutting region is therefore not to be decisively detected or recognized for each individual plant, but rather also for different plant species provided for propagation. This recognition individually by plant and also specifically by plant species of preferred cutting regions presents a significant problem to industrialized plant propagation. While it does not represent a problem for trained personnel to select an optimal cutting region for each specific plant, this selection of a preferred cutting region is difficult for known image recognition devices.

In addition, it has been possible to establish that the automated cutting of plants results in a cutting picture which has a lower quality in comparison to a cut carried out manually. In particular the growth or the propagation or the root development on the clone plant is thus at least inhibited. The overall growth or propagation rate of the plants is decreased by this reduction of the root development. The cutting picture is dependent on the cutting region on an individual plant, on the one hand, but also on the plant species. The cutting resistance of a plant is strongly dependent on the tissue structure of the plant to be cut. Plants having a soft tissue may thus be cut more easily than plants having a hard tissue, which ultimately also has an effect on the quality of the cut. The regions of a plant which are suitable for a cut can also have different strengths. Thus, for example, a younger and therefore thinner branch can be cut with less application of force than a thicker branch of a plant.

BRIEF SUMMARY OF THE INVENTION

The invention is therefore based on the object of providing a method and a device for propagating plants, by which the propagation or growth rate of the plants can be increased.

An achievement of this object is a method for propagating plants, in which at least one plant is recorded at least in regions by an image recognition device and plant-specific features of the at least one plant are recognized by a control unit on the basis of the items of information obtained by the image recognition device. In dependence on the recognized features, at least one component of the plant is then severed from the plant automatically by a cutting means for propagation. In accordance with the recognized plant-specific features of the plant, a type and/or physical properties of the cutting means are selected to increase a propagation rate of the plants. The quality of the cut on the plant or the mother plant or the severed component or the clone is very decisive for the further growth or the root development on the severed component or the clone. The clone can be cut off of the mother plant by a plant-specific or position-specific selection of the cutting means and/or its physical properties, in such a way that the growth or the root development is promoted or even stimulated on the clone. The overall efficiency or effectiveness of the propagation of the plants is improved by this promotion of the growth rate or root development of the clone.

The plant-specific features can be, for example, the size or thickness of leaves, stems, branches, and the like and also the composition of a cell structure or a tissue of the plant. Since each plant species or genus has an individual tissue, the plants also differ in their cutting resistance. Upon the selection of a suitable cutting means having optimized physical properties, the plant can be cut without the cells in the tissue of the plant being disadvantageously impaired. Rather, the growth of the cells can even be stimulated by the acting electromagnetic energy, for example of a laser.

A further achievement of the mentioned object is a method for the propagation of plants, in which at least one plant is recorded at least in regions by an image recognition device and plant-specific features are recognized by a control unit on the basis of the items of information obtained by the image recognition device about the at least one plant. In dependence on these recognized features, at least one component of the plant is then automatically severed from the plant by a cutting means for propagation. Furthermore, it is provided according to the invention that the severed component of the plant or a clone of the plant is transported away on a sterile conveying means, preferably a belt conveyor, a band conveyor, a tablet, or the like. It is ensured by the sterility of the conveying means that the cut surface of the severed component of the plant or clone is not contaminated by foreign materials, which under certain circumstances can result in a loss of the clone or a reduced growth rate.

The individual plant components or the clones can be transported to further workspaces via the conveying means, at which the components are either further processed fully automatically, i.e., automatically supplied to a nutrient medium for the further growth process, semiautomatically, in that some processes are performed by machine and others manually by personnel, or are further processed completely manually by personnel. In particular the transport of the clones on individual tablets enables simple distribution or assignment of the clones to various further processing regions, in which the individual clones are handled differently. In this way, on the one hand, a high growth rate or good root development may be ensured by the sterility of the conveying means and, on the other hand, the entire propagation process may be made very flexible.

In particular, it is provided that, in dependence on the recognized plant-specific features, a blade, a laser beam, a water jet, a plasma beam, a hot wire, or the like is used as the cutting means, wherein the physical properties of the cutting means, for example, wavelength, intensity, focal length, pressure, temperature, material, are adapted specifically to the application. It has been shown that certain cutting means are particularly suitable for certain types of tissue. A particularly high cutting quality may be effectuated by the use of a laser beam. It has thus been shown in the case of certain types of tissue that the treatment or the cut by means of laser not only results in the severing of a component, but also stimulates the growth or the root development of the clone.

Depending on plant-specific features, it is additionally provided that, for example, the intensity, the wavelength, and/or the focal length of the laser is set in such a way that the electromagnetic energy of the laser is transferred with pinpoint precision and in a controlled manner to the plant. An elevated growth rate is to be effectuated by this controlled depositing of the laser energy on the cut region. Similarly, the physical properties of a water jet or a plasma beam may be set specifically by plant. The adjustment of the focal length moreover has the advantage that in particular a cut is only performed where the plant is located and not beyond this region. In addition, the use of a blade or a hot wire for severing a component of a plant can also prove to be advantageous.

It can be provided according to the invention that a laser used as the cutting means is automatically modulated by the control unit in dependence on recognized plant-specific features. The electromagnetic waves in particular are adjusted by this modulation of the laser in such a way that they are suitable for an optimal cut having a stimulating effect for the root development. This modulation is carried out individually by the control unit for each individual plant.

The invention preferably furthermore provides that the plant is recorded by at least two, preferably three, four, or more cameras, in particular camera pairs, of the image recognition device from various perspectives to create an at least partially three-dimensional representation of the plant. To be able to recognize the plant-specific features of each individual plant, the plant to be propagated is recorded by at least two cameras to obtain the most comprehensive possible items of information about the type or composition and formation of the plant. The specific features are then recognized by the control unit on the basis of these items of information. A neural network can be used in the control unit for the recognition of the features. The neural network can determine optimal cutting regions or lines in dependence on the plant-specific features with a high accuracy within a very short time on the basis of the recorded images and the items of information of comparison plants previously provided to the control unit. In addition, the optimal cutting means for this cut having adapted physical properties can be ascertained by the neural network. Due to the use of this artificial intelligence, the individuality of each plant can be taken into consideration and at the same time an optimal cut can be achieved for an elevated propagation or growth rate.

Furthermore, the invention can provide that the plant hangs on a gripping means or lies on a conveying means or is held by a person during the recording by the image recognition device. Depending on the complexity of the plant, it can be recorded hanging on a gripping means by a plurality of cameras from various perspectives to determine a cutting region. For less complex plants or for plants in which the cut is less critical for the growth rate, the recognition and the cut can also take place lying on a conveyor belt. Fewer cameras are possibly necessary for this purpose to record sufficient items of information for ascertaining optimal cutting lines. In addition, the option exists that, for example, for a pre-treatment, the plants are led past the cutting means by a person.

A further advantageous exemplary embodiment of the invention can provide that the at least one plant is first grasped by a first gripping means and in particular isolated, the at least one plant is deliberately cut into multiple clones while hanging on the first gripper, and the individual clones are automatically transported away by a second gripping means for the further processing. It can be provided in each mentioned method step that the plant is recorded by an image recognition device, consisting of one or more cameras, and positions for grasping, for cutting, and for further processing are ascertained.

The invention can preferably additionally provide that the plant or the component of the plant is recorded by a first image recognition device before the grasping and, in particular by a neural network, an optimal position for grasping is ascertained and/or the plant or the component of the plant is recorded before the cutting by a second image recognition device and, in particular by a neural network, an optimal cutting line is ascertained. Both stored items of information about the specific plant and also items of information which are collected during the method are used by the neural network here. Due to the continuous additional learning of the neural network, a high level of accuracy results, which ultimately also results in an increase of the method speed. The use of costly personnel may be dispensed with at least nearly completely due to the use of this artificial intelligence, whereby the entire method of the propagation of plants becomes more efficient.

In particular, it can be provided that a coordinate network is assigned to the plant and/or a component of the plant during the transport or the transport away on the conveying means in order to be able to uniquely identify the plant or the component during the method. As soon as the plant or the component or the clone is deposited on the conveying means, at least one coordinate on the conveying means is assigned to it. It may be accurately determined and tracked for the further method by the specification of these coordinates where which plant is located with which component. For the further processing, all items of information about the course of the method and the cutting parameters used may thus be saved for each plant. If it is established at a later point in time that the physical properties used of the employed cutting means have resulted in particularly stimulating root development, these items of information may be supplied to the neural network again. This applies similarly to physical properties of the cutting means which have not contributed to a promotion of the growth process.

Furthermore, it is provided for the image recognition that the plant is reoriented, in particular rotated, by the gripping means between two image recordings by the image recognition device, in order to record the plant from various perspectives by way of the image recognition device. Cameras can be saved due to this reorientation of the plant relative to the cameras. On the other hand, the time for the recording of the plant can be shortened by the use of a plurality of cameras.

In addition, a further exemplary embodiment provides that the plant is recorded by groups, preferably by pairs, in succession of various cameras of the image recognition device from various perspectives to create an at least nearly complete image of the plant, wherein the plant is illuminated from various perspectives during the image recording, in such a way that the cameras are not dazzled. The plant can be moved here in a ring-like image recognition device while hanging on a gripping means. Lamps and cameras are alternately located at regular intervals on the wall of the ring-like image recognition device. Two or more cameras of an angle region are then in each case simultaneously initiated for a recording of the plant. At the same time, the plant is illuminated from a similar direction in which the cameras are also positioned. The illumination can be carried out by one, two, or more lamps. After completion of this first recording, further recordings are carried out by further camera pairs along the ring circumference, so that ultimately a comprehensive recording of the plant from all directions has been created along the ring circumference. In addition, it can be provided that the plant is slightly rotated after each recording to be able to reduce the number of the cameras. The activation of the cameras or the lamps is carried out by a separate controller of the image recognition device. The entire image recording process can be made very fast by this controller. It can be provided that the plant to be propagated is guided in each case into this ring-like image recognition device or the image recognition device is moved over the plant for the recording. It is similarly conceivable that the ring-like image recognition device is located above a conveying means guiding the plants. In this case, the cameras and the lamps are inclined slightly downward to record the plant lying on the conveyor belt. In this way, a fully comprehensive image of the plant may be created by the control unit, in particular by the neural network, whereby the creation of an optimum cutting position is possible. The selection of the physical properties of the cutting means may also be reliably determined by this fully comprehensive recording of the plant.

A further exemplary embodiment of the method can provide that cutting lines, preferably a U cut or a V cut or the like, which simultaneously capture two, three, or more components, in particular leaves and/or a stem, of the plant, are ascertained by the control unit on the basis of the ascertained plant-specific features of each plant. The cutting means then executes such a single cut, for example in the shape of a "U" or a "V". A laser, a plasma gun, or a water nozzle can be installed on a robot arm for this purpose, for example, which is brought into position by the control unit. The process of propagating can be accelerated and thus made more efficient by a repeated cut by a cutting movement.

Furthermore, it is conceivable that cutting lines, preferably a U cut or a V cut or the like, which result in a particularly large cut surface on the severed components, are ascertained by the control unit on the basis of the ascertained plant-specific features of each plant. The clone can absorb more nutrients through large cut surfaces, which results in an improvement or stimulation of the root development or the growth.

A device for achieving the object mentioned at the outset is a device for propagating plants that has at least one image recognition device for recording at least one plant at least in regions. Furthermore, the device has a control unit for recognizing plant-specific features on the basis of the items of information about the at least one plant obtained by the image recognition device and at least one transport means for transporting the plant or a component of the plant. Furthermore, the device has at least one cutting means for cutting the plant or the component of the plant, wherein the physical properties of the cutting means are variable in dependence on the recognized plant-specific features in order to increase the propagation rate or the root development rate of the plant. Not only may the propagation rate of the plant be increased, but also the growth rate or the root development rate may be increased by the recording of the plant, the recognition of the plant-specific features, and the feature-dependent cutting of the plant. The root development of the severed component of the plant, the clone, may even be stimulated by the targeted application of a specific cutting means and an adaptation of the physical properties of the cutting means. Thus, increased efficiency of the entire method for propagating plants can be achieved.

In particular, the invention can provide that the cutting means is a blade, a laser beam, a water jet, a plasma beam, a hot wire, or the like, wherein the physical properties of the cutting means, for example, wavelength, intensity, focal length, pressure, temperature, material, are adaptable specifically to the application. The various cutting means are each arranged on a separate gripper arm or robot arm or are assigned directly to the gripping means. The cutting means may be guided to the corresponding cutting positions by corresponding lines, cables, or the like. If lasers are used, for example, mirrors may be used to deposit the electromagnetic energy with pinpoint precision on the plant. All mentioned cutting means can have a control unit, via which its physical properties are settable. In particular if a laser is used, a control unit is assigned thereto, using which the focus or the focal length is settable or movable, respectively, in such a way that the electromagnetic energy is deposited precisely where the cut is to take place. Similar devices are also provided for the use of a water jet and a plasma beam.

It is preferably provided that the image recognition device is at least one camera or at least one group of cameras or at least one fiber-optic unit having a camera, which are arrangeable around the plant or the component of the plant in such a way that at least nearly all sides of the plant are recordable. It is thus conceivable that the plant is recorded by cameras arranged in pairs from different directions to create a three-dimensional recording of the plant. The camera may also be flexibly assigned to a robot arm by way of the use of a fiber-optic unit. The illumination of the plant can similarly be carried out with pinpoint accuracy by means of optical fibers.

A further exemplary embodiment of the invention can provide that the transport means are grippers and/or conveyor belts, wherein the conveyor belts are produced in particular from a metal, a plastic, or a ceramic or have a corresponding coating. The conveyor belts used are designed in such a way that they can both be sterilized to avoid microbial contamination of the cutting surfaces and/or are also resistant to effects of the cutting means. The conveyor belts can thus be produced from a plastic, for example, which is at least substantially resistant to intensive electromagnetic laser radiation. Using conveyor belts designed in this way, the plants may also be cut by the laser while lying on the conveyor belt, without the conveyor belts thus being damaged.

Furthermore, it can be provided that at least one image recognition device for ascertaining an optimal position for grasping a component of the plant, a gripping means for grasping the component, and a cutting means, preferably a laser or a plasma gun, for targeted cutting on the plant are arranged on a head of a robot arm. By way of this compact unit, which comprises the image recognition, the gripping means, and also the cutting means, components may also be severed from larger plants without these having to be removed from a nutrient medium for this purpose. It is thus conceivable that such a compact unit travels over a large number of planted plants in a greenhouse and searches for suitable positions for cutting off a component or a clone to then sever a suitable component from the mother plant and further process it.

In addition, it can be provided according to the invention that a control unit has a processor unit for operating a neural network. The neural network is used for evaluating the items of information obtained by the at least one image recognition device about the plants and the automated recognition of plant-specific features. The neural network uses saved or stored plant-specific features of other plants of the same species for this purpose. In addition, the control unit is used for initializing further method steps in dependence on the recognized plant-specific features of the recorded plants. This control unit can either be directly assigned to the device for propagating plants or can be installed in a decentralized manner on a server. Optimum cutting pictures for cloning plants may be ascertained particularly efficiently by this combination of image recognition with a neural network, which additionally result in improved root development on the clone.

BRIEF DESCRIPTION OF THE DRAWINGS

Preferred exemplary embodiments of the invention are described in more detail hereinafter on the basis of the drawing. In the figures.

DETAILED DESCRIPTION OF PREFERRED EMBODIMENTS

Figure 1:
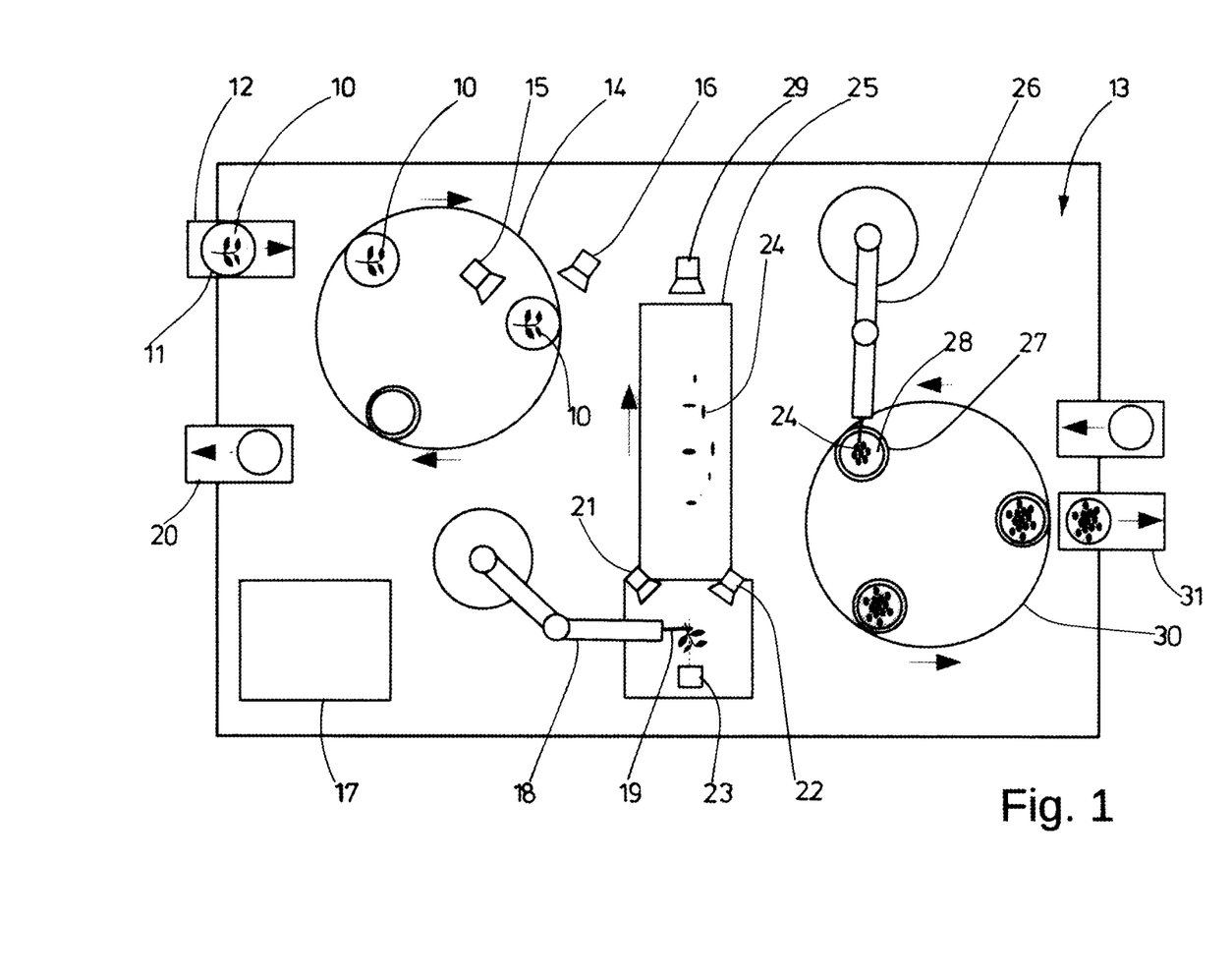
FIG. 1 shows an illustration of a first exemplary embodiment of a device.

A first exemplary embodiment of a device according to the invention is illustrated very schematically in FIG. 1. This device is essentially used for the automated propagation of plants. Not only is the propagation rate or growth rate for plants improved by the device shown here and by the method according to the invention, but also the root development of the severed plant components or clones is stimulated.

In the exemplary embodiment shown in FIG. 1, a plant 10 or a component of a plant 10 is first supplied in a preferably sterile container 11 on a conveying means 12 to a work area 13. This work area 13 can possibly also be kept sterile. The container 11 including the plant 10 is supplied to a first conveyor 14 by the conveying means 12, which can be designed, for example, as an airlock. This first conveyor 14 can also be, in addition to the exemplary embodiment shown in FIG. 1 as a rotating disk, a conveyor belt or a tablet. The plant 10 is recorded by an image recognition device having two cameras 15, 16 on this first conveyor 14. Positions, at which the plant 10 can particularly preferably be grasped by the first gripping means 18, are ascertained by the control unit on the basis of the items of information thus obtained about the plant 10. The first gripping means 18, which is designed here as a robot arm, has tweezers 19, using which the plant 10 is removed from the container 11. If the plant 10 is solidly rooted in the container 11, the plant 10 can be pulled out of the container 11 or can be severed from the roots using, for example, an arbitrary cut by a cutting means. The container 11, which is then empty, is removed from the work area 13 again via a further conveying means 20.

The plant 10 hanging on the tweezers 19 is then supplied to a further image recognition device having two further cameras 21, 22. Pictures from various perspectives are recorded of the hanging plant 10 by these cameras 21, 22. The items of information thus obtained about the plant 10 are used by the control unit 17 to recognize plant-specific features of the plant. These plant-specific features can be, for example, the species of the plant and also properties of leaves, stems, or branches. It is additionally conceivable that the control unit 17 recognizes the species of the plant. However, it is similarly also conceivable that an operator has previously input the species of the plant to be propagated into the control unit 17 via an input means. An ideal cutting position or an ideal cutting pattern is then ascertained in the control unit 17 via a neural network on the basis of the recognized plant-specific features. In this case, the neural network not only uses the items of information of the present plant 10 for this determination, but also items of information about previous plants and data which were previously made available by an operator to the neural network.

With the aid of this artificial intelligence, not only is the ideal cutting line determined, but also the type and/or the physical properties of a cutting means for an optimum cut are determined. In the exemplary embodiment shown in FIG. 1, the cutting means is a laser 23. This laser 23 can be modulated in dependence on the recognized plant-specific features in such a way that a cutting picture which is particularly preferred for the root development of the clone is generated. It has been shown that the root development and thus the growth of the clone can be stimulated by the selection of the laser properties. For an ideal cutting picture or cutting pattern, the intensity of the laser, the wavelength, and also the focus or the focal length are changed in such a way that the plant is cut without contact and thus without crushing. The tissue of the plant is almost not negatively affected by this targeted depositing of the energy; rather the further growth is even stimulated.

The severed component 24 or the clone then falls on a second conveyor 25. It can be provided that a second gripping means 26 grasps the clone 24 from this second conveyor 25 and supplies it to a container 27 having a nutrient medium 28. A camera 29, which is also connected to the control unit 17 for ascertaining an optimum gripping position, is also used for preferred picking up of the clone 24 by the second grasping means 26. The containers 27 thus filled are then transferred out of the work area 13 via a third conveyor 30 and a conveying means 31. Movement directions of the individual components are symbolized by the arrows shown in FIG. 1.

Therefore, plant-specific features of the plant 10 are recognized by the image recognition shown in FIG. 1 and cutting lines are ascertained by the neural network, along which the plant is then cut using a suitable cutting means. It is to be noted here that the invention is not restricted to the illustrated number of the gripping means 18, 26, the number of the conveyors 14, 25, 30, and the number of the cameras 15, 21, 22, 29. Rather, it can be provided that the device for image recognition is assigned a plurality of cameras. It is similarly conceivable that the device has only one conveying means for conveying away a clone.

Figure 2:
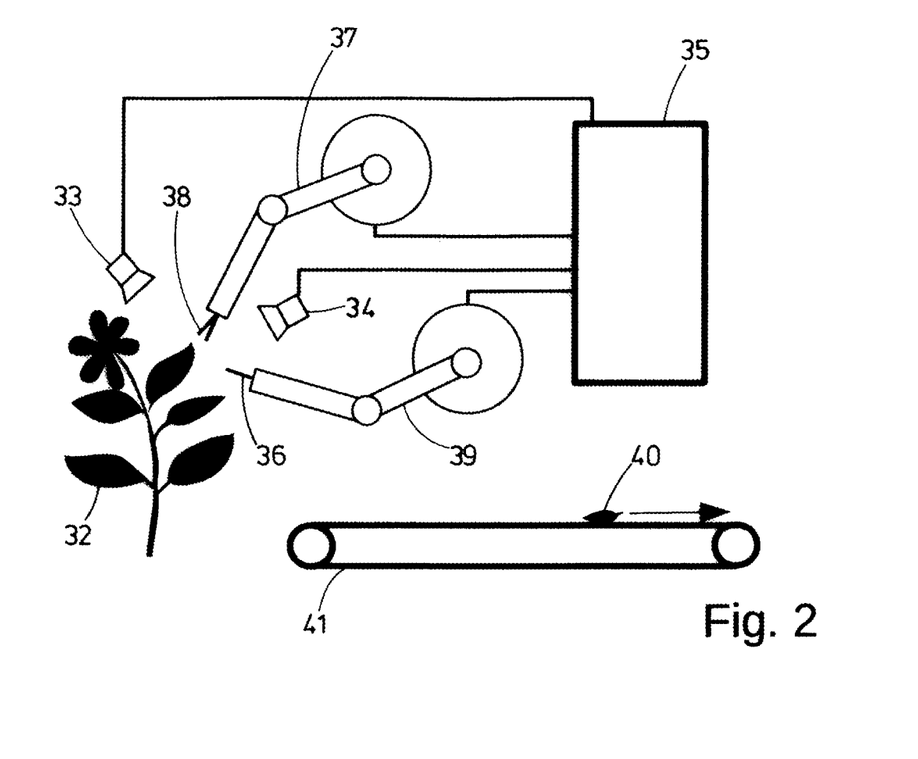
FIG. 2 shows an illustration of a second exemplary embodiment of the device.

FIG. 2 shows a second exemplary embodiment of the present invention. A position which is particularly well suitable for cutting off a clone is ascertained here by the cameras 33, 34 of the image recognition device directly at the plant 32. The cameras 33, 34 are also connected here to a control unit 35. The control unit 35 ascertains with the aid of a neural network not only an optimal cutting position or an optimal cutting line, but also optimal cutting conditions. It is thus determined by the neural network how the laser 36 used here is to be modulated or controlled to create an ideal cutting picture. In addition to the modulation, the adjustment of the focal length to the position to be cut also takes place. As soon as a corresponding position for cutting the plant 32 has been ascertained by the control unit 35, the plant component is grasped by the gripping means 37 by means of tweezers 38 and the second robot arm holding the laser 36 is moved in such a way that the plant is cut according to the ascertained cutting picture. The severed component 40 or the clone of the plant 32 can then be deposited by the gripping means 37 on a conveyor 41. The conveyor 41 then transports the severed component 40 to a further station for processing. The severed component 40 can be further processed here, for example, according to the method shown in FIG. 1.

Figure 3:
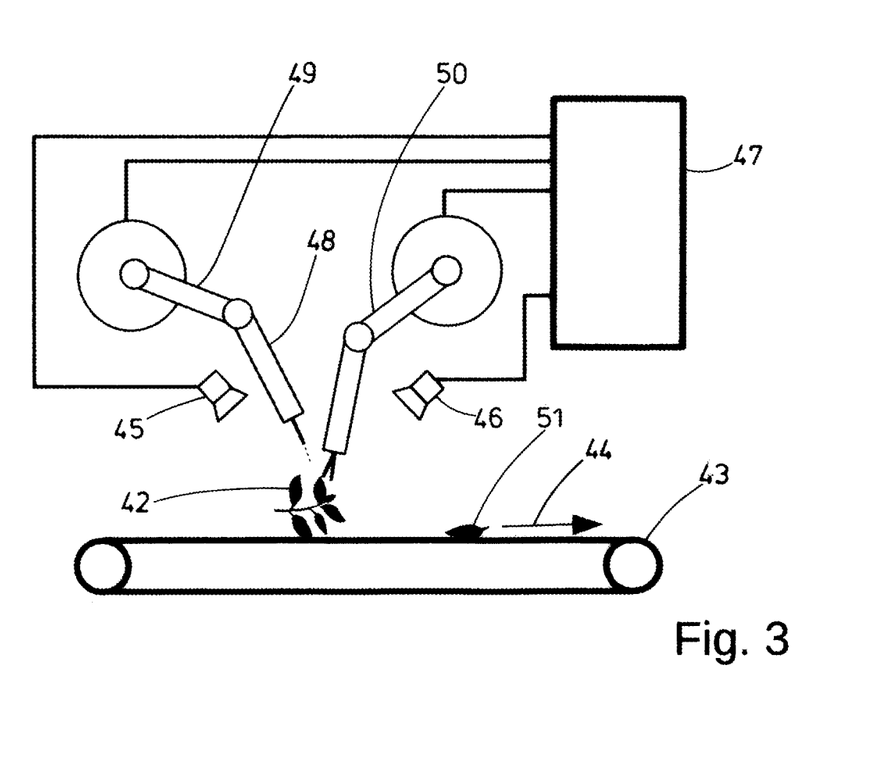
FIG. 3 shows an illustration of a further exemplary embodiment of the device.

A further exemplary embodiment of the invention is shown in FIG. 3. In this exemplary embodiment, a plant 42 or a component of a plant 42 lies on a conveyor 43 and is supplied in the arrow direction 44 to an image processing device consisting of two cameras 45 and 46. Notwithstanding the exemplary embodiment shown here, the image recognition device can also have further cameras. Precisely as described above in the example shown in FIG. 2, an optimum cutting picture and preferred physical properties of the cutting means or the laser are also ascertained here by the cameras 45, 46 and by a control unit 47 and a neural network. As soon as these items of information have been generated by the control unit 47, a corresponding cut is executed by the laser 48. It is also conceivable that the plant 42 is cut repeatedly by the laser 48. The laser 48 is also assigned here to a robot arm 49 for optimum mobility. In the exemplary embodiment shown in FIG. 3, the gripping means 50 is solely used for the purpose of either depositing the plant 42 on the conveyor 43, removing remaining components of the plant 42 from the conveyor 43, or supplying the severed component 51 to a further processing station. However, it is also conceivable that in the exemplary embodiment of the invention shown in FIG. 3, the gripping means 50 is dispensed with completely.

The conveyors or conveying means shown here can both be sterilized for a germ-free propagation and/or are also resistant to the effect of the electromagnetic laser radiation. For the case in which energy is deposited on the conveyor during the use of a laser for dividing the plant, the conveyor is not immediately destroyed. A heat-resistant plastic or a corresponding coating of the conveyor with, for example, ceramic suggests itself as a suitable material. A long-term and reliable transport of the plant or the components of the plant can thus be guaranteed.

Figure 8A:
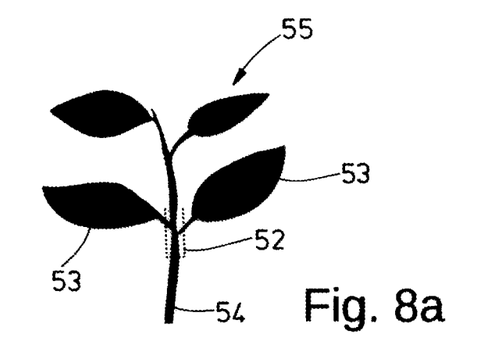
FIG. 8a shows an illustration of a first cutting line.

Depending on the type of the plant and the requirements for the division, it can be advantageous to use various cutting pictures for the cutting. A U-shaped cut is shown in FIG. 8a, which severs both two leaves 53 and also a part of the stem 54 from the plant 55. Three components of the plant 55 are thus severed by a single cut by means of a laser, a water jet, or a plasma beam. Three individual cuts would be necessary for this purpose in the case of manual, conventional cutting. This U cut 52 can take place both in a position of the plant 55 hanging on a gripping means and also in a position lying on a conveyor. It is additionally conceivable that such a cut is also carried out by a stamping means made of metal or a ceramic. A puncher can in particular be kept free of germs here by application of heat or electric current. However, a particularly preferred contactless and non-crushing cut may only be implemented by the use of a laser beam or a water jet or a plasma beam.

Figure 8B:
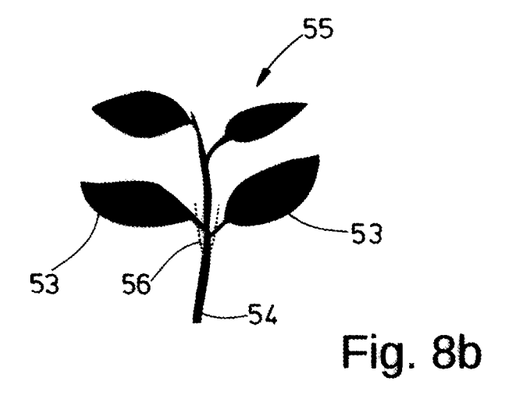
FIG. 8b shows an illustration of a second cutting line.

In addition to the U cut 52 shown in FIG. 8a, it is additionally conceivable to execute a V cut 56 using the laser (FIG. 8b). Both two leaves 53 and also a part of the stem 54 are also cut off here. However, the cut in the stem 54 differs from the straight cut from FIG. 8a. This V cut 56 can be advantageous at least for some plant species, especially for the root development of the cut edge.

Furthermore, it can be provided that the V cut 56 from FIG. 8b is placed slightly adjacent to the stem 54, whereby, on the one hand, two leaves 53 are still severed from the plant 55 by one cut and in addition a cut surface on the stem 54 is maximized. The severed component of the plant 55 can absorb a particularly large amount of nutrients through this particularly large cut surface, which results in a particularly preferred growth rate or root development.

Figure 8C:
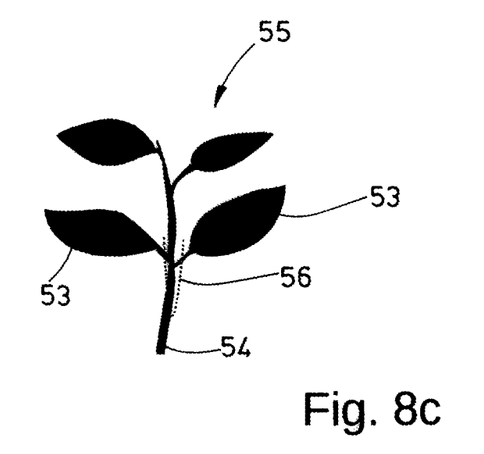
FIG. 8c shows an illustration of a third cutting line.

In addition to the examples for cutting pictures shown in FIGS. 8a to 8c, a plurality of further cutting images is conceivable, using which multiple components of a plant are cut simultaneously in an efficient manner and the root development of the severed plant is stimulated.

Figure 4:
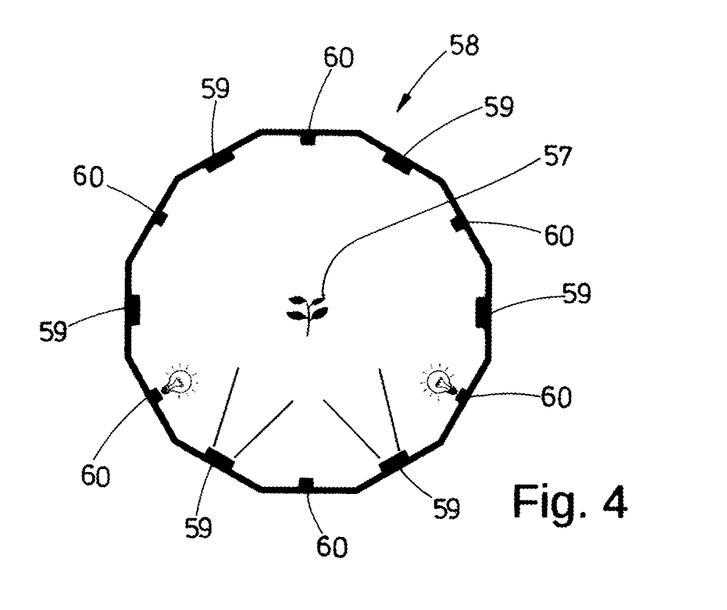
FIG. 4 shows an illustration of a first step of image recognition.
Figure 5:
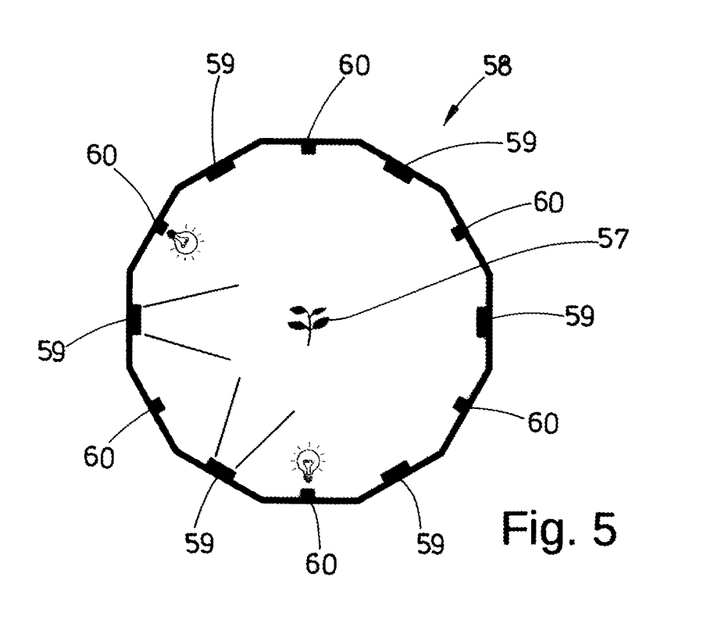
FIG. 5 shows an illustration of a second step of the image recognition.
Figure 6:
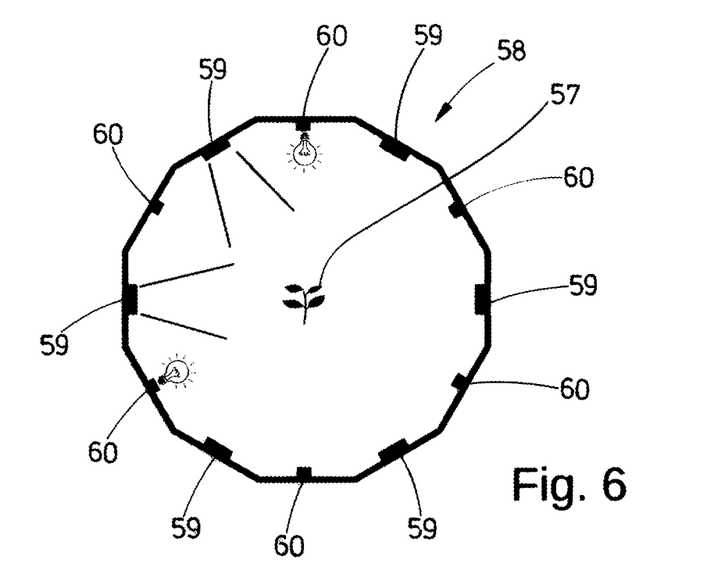
FIG. 6 shows an illustration of a third step of the image recognition.

An exemplary embodiment according to the invention of the image recognition of a plant 57 is shown very schematically in FIGS. 4 to 6. For the recording of a three-dimensional depiction of the plant 57, said plant is suspended by a gripping means (not shown) in a ring-like image recognition device 58. The plant 57 is preferably positioned centrally in the image recognition device 58 here. The ring can have a diameter of a few decimeters, i.e., 20 cm to 30 cm or 30 cm to 40 cm or 40 cm to 50 cm, and a wall height of 5 cm to 10 cm or 10 cm to 20 cm or 20 cm to 30 cm. However, it is also conceivable that the image recognition device 58 shown here is dimensioned differently. In the exemplary embodiment of the image recognition device 58 shown in FIGS. 4 to 6, the ring has 12 straight sections. These twelve sections are each alternately assigned a camera 59 and a lamp 60. That is to say, six cameras 59 and six lamps 60 are assigned to the illustrated exemplary embodiment of the image recognition device 58.

In a first step of the image recognition, two adjacent cameras 59 are activated. At the same time, lamps 60 which are close to the cameras 59 are triggered and sufficiently illuminate the plant 57 (FIG. 4). The lamps 60 are to be switched in such a way that they do not dazzle the activated cameras 59. The remaining cameras 59 or lamps 60 are not activated. In a second step shown in FIG. 5, a following pair of cameras 59 is activated and the two adjacent lamps 60 are also switched on. In the following step of the image recognition according to FIG. 6, a next pair of cameras 59 and the corresponding lamps 60 are activated. This method is continued until the plant 57 has been recorded from all directions over a spatial angle of 360° by six camera pairs, i.e., twelve pictures. The successive activation of the cameras 59 and the lamps 60 is carried out here by a control unit assigned to the image recognition device 58.

The images thus recorded are evaluated by the above-discussed control unit or by the neural network. This evaluation includes the recognition of plant-specific features, along which the plant can preferably be divided by a cutting means. This image recording or this sequence of the individual pictures lasts a few hundred milliseconds.

Furthermore, it can be provided that the plant 57 is cut directly in the ring-like image recognition device 58, also called a theater, by a cutting means. The severed component of the plant 57 can either be grasped by a further gripping means or conveyed away on a conveyor positioned below the image recognition device 58.

The cameras activated in FIGS. 4 to 6 are highlighted by a schematically illustrated recording cone. An incandescent bulb is assigned to each of the lamps 60 activated in FIGS. 4 to 6.

Figure 7:
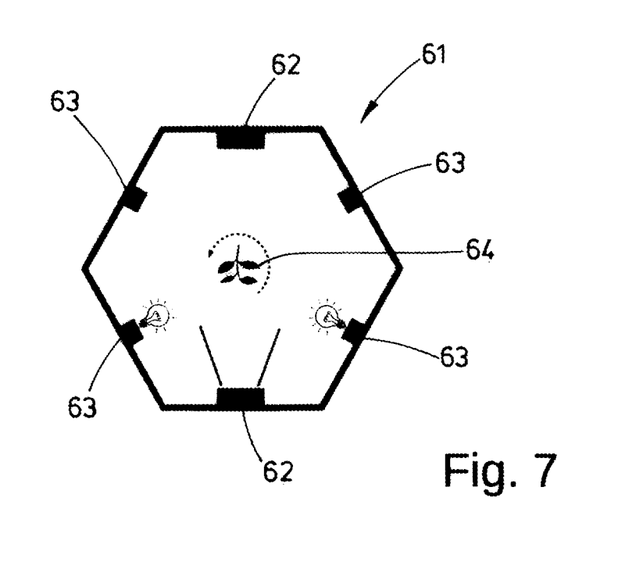
FIG. 7 shows an illustration of a further exemplary embodiment of the image recognition.

A further exemplary embodiment of an image recognition device 61 is shown in FIG. 7. This exemplary embodiment is also made ring-like, similarly as in the exemplary embodiment of an image recognition device 58 shown in FIGS. 4 to 6. However, the ring only has six straight lateral surfaces here. Accordingly, only two opposing cameras 62 and four lamps 63 are assigned to the inner walls of the image recognition device 61. Precisely as described above, in each case one camera 62 is activated together with two adjoining lamps 63 to create an image of the plant 64. The correspondingly opposing camera 62 and the opposing lamps 63 are then activated to create a second picture of the plant 64. To compensate for the smaller number of the cameras, the plant 64 is rotated by a specific angle range after each picture, so that multiple pictures from various positions of the plant 64 are made in succession. Plant-specific features of the plant 64 may in turn be recognized from the entirety of all images thus obtained by the control unit or the neural network.

In addition to the exemplary embodiments shown here of the image recognition devices 58, 61, further geometries having more or fewer cameras are conceivable. These image recognition devices 58, 61 can be assigned to the exemplary embodiments of the invention according to FIGS. 1 to 3. A particularly efficient method for propagating plants may be created by this combination of the image recognition and the specific cutting method.

LIST OF REFERENCE NUMERALS 10 plant
11 container
12 conveying means
13 work area
14 first conveyor
15 camera
16 camera
17 control unit
18 first gripping means
19 tweezers
20 conveying means
21 camera
22 camera
23 laser
24 component
25 second conveyor
26 second gripping means
27 container
28 nutrient medium
29 camera
30 third conveyor
31 conveying means
32 plant
33 camera
34 camera
35 control unit
36 laser
37 gripping means
38 tweezers
39 robot arm
40 component
41 conveyor
42 plant
43 conveyor
44 arrow direction
45 camera
46 camera
47 control unit
48 laser
49 robot arm
50 gripping means
51 component
52 U cut
53 leaf
54 stem
55 plant
56 V cut
57 plant
58 image recognition device
59 camera
60 lamp
61 image recognition device
62 camera
63 lamp
64 plant

The invention claimed is:

1. A method for propagating plants (10, 32, 42, 55, 57, 64), comprising the steps of:

recording a plant (10, 32, 42, 55, 57, 64) at least in regions by an image recognition device;

recognizing plant-specific features by a control unit (17, 35, 47) on the basis of items of information obtained by the image recognition device about the plant (10, 32, 42, 55, 57, 64);

in dependence on the recognized features, cutting at least one component (24, 40, 51) of the plant (10, 32, 42, 55, 57, 64) automatically by a cutting means from the plant (10, 32, 42, 55, 57, 64) for propagation;

selecting a type and physical properties of the cutting means in accordance with the recognized plant-specific features of the plant (10, 32, 42, 55, 57, 64) to increase a propagation rate of the plant (10, 32, 42, 55, 57, 64), wherein, in dependence on the recognized plant-specific features, a blade, a laser beam (23, 36, 48), a water jet, a plasma beam, or a hot wire is used as the cutting means, wherein the physical properties of the cutting means are adapted specifically to an application;

automatically modulating the cutting means in dependence on the plant-specific features recognized by the control unit (17, 35, 47);

recording the at least one component (24, 40, 51) of the plant (10, 32, 42, 55, 57, 64) by an image recognition device and, by a neural network;

ascertaining an optimum position for grasping the at least one component (24, 40, 51) of the plant (10, 32, 42, 55, 57, 64) and ascertaining an optimum cutting line for cutting the component (24, 40, 51) of the plant (10, 32, 42, 55, 57, 64); and cutting the at least one component (24, 40, 51) of the plant (10, 32, 42, 55, 57, 64) along the cutting line into clones using the cutting means, wherein the plant-specific features of each plant (10, 32, 42, 55, 57, 64) are recognized by the control unit (17, 35, 47), fully automatically and by the neural network, on the basis of the items of information obtained by the image recognition device and on the basis of corresponding previously stored features of a similar plant (10, 32, 42, 55, 57, 64), wherein the cutting means is modulated in dependence on a recognized one of the plant-specific features in such a way that a pattern for cutting the plant is ascertained on the basis of the items of information obtained by the image recognition device and on the basis of corresponding previously stored features of a similar plant (10, 32, 42, 55, 57, 64), whereby the pattern for cutting the plant is optimized for root development and subsequent accelerated growth and propagation of the clones generated so as to cut the plant without contact and without crushing the plant, wherein modulation of the physical properties of the cutting means is selected according to a tissue type of the plant in such a way that exposed plant tissue is stimulated by the cutting means cutting the at least one component (24, 40, 51) of the plant (10, 32, 42, 55, 57, 64) for enhanced growth, and wherein the at least one component (24, 40, 51) cut from the plant (10, 32, 42, 55, 57, 64) or a clone of the plant (10, 32, 42, 55, 57, 64) is transported away on a sterile conveying means (25, 41, 43), wherein the plant (10, 32, 42, 55, 57, 64) is recorded by at least two cameras (16, 21, 22, 29, 33, 34, 45, 46, 59, 62), namely camera pairs, of the image recognition device from various perspectives to create an at least partially three-dimensional representation of the plant (10, 32, 42, 55, 57, 64), wherein the plant (10, 32, 42, 55, 57, 64), during the recording by the image recognition device, hangs on a gripping means (18) or lies or stands on the conveying means (14, 25, 41, 43) or is held by a person, wherein the plant (10, 32, 42, 55, 57, 64) is first grasped by a first gripping means (18) and isolated, the plant (10, 32, 42, 55, 57, 64) is deliberately cut into multiple individual clones while hanging on the first gripping means (18), and the multiple individual clones are automatically transported away by a second gripping means (26) for further processing, wherein a coordinate set is assigned to the clone of the plant (10, 32, 42, 55, 57, 64) and/or the at least one component (24, 40, 51) of the plant (10, 32, 42, 55, 57, 64) during the transport or transport away on the conveying means (14, 25, 41, 43), to be able to uniquely identify the plant (10, 32, 42, 55, 57, 64) or the at least one component (24, 40, 51) during the method, wherein the plant (10, 32, 42, 55, 57, 64) is reoriented by rotation by a gripping means (18) between two image recordings by the image recognition device, in order to record the plant (10, 32, 42, 55, 57, 64) by way of the image recognition device from various perspectives.

2. The method for propagating plants (10, 32, 42, 55, 57, 64) as claimed in claim 1, wherein the plant (10, 32, 42, 55, 57, 64) is recorded in succession by groups of various cameras (16, 21, 22, 29, 33, 34, 45, 46, 59, 62) of the image recognition device from various perspectives to create an at least nearly complete image of the plant (10, 32, 42, 55, 57, 64), wherein the plant (10, 32, 42, 55, 57, 64) is illuminated from various perspectives during the image recording, in such a way that the cameras (16, 21, 22, 29, 33, 34, 45, 46, 59, 62) are not dazzled.

3. The method for propagating plants (10, 32, 42, 55, 57, 64) as claimed in claim 1, wherein the plant (10, 32, 42, 55, 57, 64) or the at least one component (24, 40, 51) of the plant (10, 32, 42, 55, 57, 64) is grasped by a gripping means (18) and, in a position hanging on the gripping means (18), is recognized by the image recognition device and cut by the cutting means.

4. The method for propagating plants (10, 32, 42, 55, 57, 64) as claimed in claim 1, wherein all obtained items of information and the plant-specific features of each plant (10, 32, 42, 55, 57, 64) ascertained therefrom are collected in a database of the control unit (17, 35, 47) and are used for the recognition of further plant-specific features of further plants (10, 32, 42, 55, 57, 64) by the neural network.

5. The method for propagating plants (10, 32, 42, 55, 57, 64) as claimed in claim 1, wherein the cutting lines are in the form of a U cut (52) or a V cut (56) and are ascertained by the control unit (17, 35, 47) on the basis of the ascertained plant-specific features of each plant (10, 32, 42, 55, 57, 64), which acquire at least two components (24, 40, 51), namely leaves (53) and/or a stem (54), of the plant (10, 32, 42, 55, 57, 64) simultaneously.

6. The method for propagating plants (10, 32, 42, 55, 57, 64) as claimed in claim 1, wherein the cutting lines are in the form of a U cut (52) or a V cut (56) and are ascertained by the control unit (17, 35, 47) on the basis of the ascertained plant-specific features of each plant (10, 32, 42, 55, 57, 64) which result in a cut surface on the at least one component (24, 40, 51).

7. The method for propagating plants (10, 32, 42, 55, 57, 64) as claimed in claim 1, wherein the cutting means is a laser beam (23, 36, 48).

8. A device for propagating plants (10, 32, 42, 55, 57, 64), the device having:

at least one image recognition device for recording at least one plant (10, 32, 42, 55, 57, 64) at least in regions;
a control unit (17, 35, 47) for recognizing plant-specific features on the basis of items of information obtained by the image recognition device about the at least one plant (10, 32, 42, 55, 57, 64);
at least one gripper or conveyor belt for transporting a plant (10, 32, 42, 55, 57, 64) or a component (24, 40, 51) of a plant (10, 32, 42, 55, 57, 64); and
at least one cutting means for cutting the plant (10, 32, 42, 55, 57, 64) or the component (24, 40, 51) of a plant (10, 32, 42, 55, 57, 64),
wherein the physical properties of the at least one cutting means are variable in dependence on the recognized plant-specific features to increase the propagation rate or a growth rate of the plants (10, 32, 42, 55, 57, 64),
wherein the at least one cutting means is a blade, a laser beam (23, 36, 48), a water jet, a plasma beam, or a hot wire,
wherein the physical properties of the cutting means are adaptable specifically to the application,
wherein the control unit (17, 35, 47) has a processor unit for operating a neural network, for evaluating the items of information obtained by the at least one image recognition device about the plant (10, 32, 42, 55, 57, 64), and for automatically recognizing plant-specific features on the basis of saved or stored plant-specific features of other plants (10, 32, 42, 55, 57, 64) of the same species and for initializing further method steps in dependence on the recognized plant-specific features of the recorded plant (10, 32, 42, 55, 57, 64),
wherein the image recognition device is at least one camera (16, 21, 22, 29, 33, 34, 45, 46, 59, 62), or at least one group of cameras (16, 21, 22, 29, 33, 34, 45, 46, 59, 62), or at least one fiber-optic unit having a camera (16, 21, 22, 29, 33, 34, 45, 46, 59, 62), which are arrangeable around the plant (10, 32, 42, 55, 57, 64) or the component (24, 40, 51) of the plant (10, 32, 42, 55, 57, 64) in such a way that at least almost all sides of the plant (10, 32, 42, 55, 57, 64) are recordable,
wherein the at least one camera (16, 21, 22, 29, 33, 34, 45, 46, 59, 62) is assigned at least one lamp (60, 63),
wherein the transport means are grippers (18, 26) and/or are conveyor belts (14, 25, 41, 43) produced from a metal, a plastic, or a ceramic or have a corresponding coating,
wherein the at least one image recognition device, a gripping means (18) for grasping the plant (10, 32, 42, 55, 57, 64) or the component (24, 40, 51) of the plant (10, 32, 42, 55, 57, 64), and a cutting means for targeted cutting on the plant (10, 32, 42, 55, 57, 64) are arranged on a head of a robot arm,
wherein the cutting means is modulated in dependence on a recognized one of the plant-specific features in such a way that a pattern for cutting the plant is ascertained on the basis of the items of information obtained by the image recognition device and on the basis of corresponding previously stored features of a similar plant (10, 32, 42, 55, 57, 64), whereby the pattern for cutting the plant is optimized for root development and subsequent accelerated growth and propagation of the clones generated so as to cut the plant without contact and without crushing the pant,
wherein modulation of the physical properties of the cutting means is selected according to a tissue type of the plant in such a way that exposed plant tissue is stimulated by the cutting means cutting the at least one component (24, 40, 51) of the plant (10, 32, 42, 55, 57, 64) for enhanced growth, and
wherein the at least one component (24, 40, 51) cut from the plant (10, 32, 42, 55, 57, 64) or a clone of the plant (10, 32, 42, 55, 57, 64) is transported away on a sterile conveying means (25, 41, 43),
wherein the device carries out a method according to claim 1.

9. The device for propagating plants (10, 32, 42, 55, 57, 64) as claimed in claim 8, wherein the cutting means is a laser beam (23, 36, 48).

* * * * *